US006073973A

United States Patent [19]
Boscaljon et al.

[11] Patent Number: 6,073,973
[45] Date of Patent: *Jun. 13, 2000

[54] LIGHTWEIGHT POSITIVE LOCK COUPLING

[75] Inventors: Ronald W. Boscaljon, Denver; Ronald A. Rossway, Aurora; David E. Jewell, Golden; Eric Hazelwood, Divide, all of Colo.

[73] Assignee: Stanley Aviation Corporation, Aurora, Colo.

[*] Notice: This patent is subject to a terminal disclaimer.

[21] Appl. No.: 09/070,229

[22] Filed: Apr. 30, 1998

Related U.S. Application Data

[63] Continuation-in-part of application No. 08/741,647, Oct. 31, 1996, Pat. No. 5,871,239.

[51] Int. Cl.⁷ .................................................. F16L 35/00
[52] U.S. Cl. ............................. 285/81; 285/92; 285/354
[58] Field of Search .............................. 285/81, 86, 92, 285/354, 233, 93

[56] References Cited

U.S. PATENT DOCUMENTS

| | | | |
|---|---|---|---|
| 3,201,149 | 8/1965 | Bragg | 285/86 |
| 3,999,825 | 12/1976 | Cannon | 339/15 |
| 4,008,937 | 2/1977 | Filippi | 339/15 |
| 4,249,786 | 2/1981 | Mahoff | 339/15 |
| 4,285,564 | 8/1981 | Spinner | 339/89 |
| 4,346,428 | 8/1982 | Gale | 361/261 |
| 4,757,593 | 7/1988 | Pallini, Jr. et al. | 285/92 |
| 4,785,858 | 11/1988 | Valentini et al. | 285/92 |
| 4,808,117 | 2/1989 | Gale et al. | 439/192 |
| 4,881,760 | 11/1989 | Runkles et al. | 285/92 |
| 4,900,070 | 2/1990 | Runkles et al. | 285/233 |
| 4,928,202 | 5/1990 | Gale et al. | 361/215 |
| 5,016,920 | 5/1991 | Anderson | 285/92 |
| 5,188,398 | 2/1993 | Parimore, Jr. et al. | 285/92 |
| 5,215,336 | 6/1993 | Worthing | 285/92 |
| 5,348,349 | 9/1994 | Sloane | 285/92 |
| 5,350,200 | 9/1994 | Peterson et al. | 285/92 |
| 5,586,790 | 12/1996 | Bynum | 285/92 |
| 5,746,454 | 5/1998 | Webb | 285/92 |
| 5,851,035 | 12/1998 | Marc et al. | 285/92 |
| 5,871,239 | 2/1999 | Boscaljon et al. | 285/81 |

FOREIGN PATENT DOCUMENTS

| | | | |
|---|---|---|---|
| 99293 | 1/1984 | European Pat. Off. | 285/92 |

*Primary Examiner*—Eric K. Nicholson
*Attorney, Agent, or Firm*—Fields and Johnson, P.C.

[57] ABSTRACT

In the first embodiment, a coupling assembly is provided wherein the inner peripheral diameter of an annular spring is sized to be threadably received over the threads of a coupler and is held in a recess formed by the ends of threads and the edge of a shoulder. This structure minimizes the diameter of the annular spring and lock ring to minimize both the size and weight of coupling assembly. Additionally, it provides a quick connect, quick disconnect coupling and has a peripheral stripe to provide a visual indication of its connected or disconnected status. In the second embodiment, a wavy spring is split which allows its diameter to be temporarily enlarged so that it can be received over the threads of the coupler and then spring back to its original smaller diameter so that it is held in a recess formed by the ends of the threads and a coupler flange. This structure also minimizes the diameter of the annular spring and lock ring to minimize both the size and weight of coupling assembly. This structure also provides a quick connect, quick disconnect coupling and has an indicator stripe to identify whether or not the coupler is in locked position.

28 Claims, 7 Drawing Sheets

LIGHTWEIGHT POSITIVE LOCK COUPLING

This application is a continuation-in-part of U.S. Ser. No. 08/741,647 filed Oct. 31, 1996 and entitled "Positive Lock Coupling" now U.S. Pat. No. 5,871,239.

TECHNICAL FIELD

This invention relates to a threaded coupling assembly for interconnecting confronting ends of first and second fluid-carrying conduits in an aircraft. More particularly, the coupling assembly has a releasable positive lock which utilizes a lock ring with biasing spring to assure that the coupling will not become inadvertently uncoupled due to vibration of the aircraft or other environmental factors. The assembly further includes indicia so that a mechanic can visually observe whether or not the coupling is positively locked.

BACKGROUND ART

Aircraft fuel systems include a large number of couplings which must be easy to connect, must provide a positive lock when connected and should include means for visually determining whether or not the coupling is secure. Also, because of the tight space constraints within an aircraft, the mechanic preferably should be able to lock and unlocked the coupling assembly with one hand. Various couplings have been developed with one or more of these objectives in mind.

Nadsady U.S. Pat. Nos. 3,669,472; Gale et al. 4,808,117 and Gale et al. 4,928,202 each disclose a coupling device in which the tightening of the coupling parts is readily accomplished but accidental loosening is restrained by spring fingers carried by one of the coupling parts which engage indentations or notches on the other coupling part in such a manner as to favor relative rotation of the coupling parts in the tightening direction while restraining with greater force the rotation of the coupling parts in the opposite unlocking direction.

Cannon U.S. Pat. Nos. 3,999,825; Filippi 4,008,937; Mahoff 4,249,786 and Gale 4,346,428 each disclose a coupling with one or more toggle latches which snap into a positive locking position.

Spinner U.S. Pat. No. 4,285,564 discloses a coaxial plug connector wherein a first ring of axially pointed teeth is provided around the circumference of a cap ring. A first connector has a ring with teeth for engaging the teeth on the cap ring. The cap ring is withdrawn axially against the force of a biasing spring when the coupling is rotated to a different position. The cap ring is released and the spring urges it into locking engagement with the tooth ring. Thus, accidental rotation of the cap ring relative to the first connector is prevented.

Runkles et al. U.S. Pat. No. 4,881,760 discloses a coupling with locking tines having visible indicia for determining whether or not the tines are in locked position.

Runkles et al. U.S. Pat. No. 4,900,070 discloses a coupling with spring biased rotatable locking tines.

Although each of the prior art references is suitable for its intended purpose, none meet the need for a positive lock on a threaded coupling which is easy to secure with one hand, and, on the other hand, provides a positive but releasable locking connection which has indicia to indicate whether or not the positive lock feature is engaged.

DISCLOSURE OF THE INVENTION

In accordance with the present invention, a threaded coupling assembly is provided for interconnecting the ends of first and second fluid-carrying conduit members in releasable locked relationship. First and second coupling members are provided for circumferentially engaging ends of the conduit members to hold them in fluid communication. Conveniently, the coupling members are rotatable in both a locking direction and an opposite unlocking direction. Each of the first and second coupling members has a peripheral facing surface with a complementary locking element thereon. A resilient member urges the peripheral facing surfaces toward each other so that at least one of the locking elements on one of the peripheral facing surfaces engages the other peripheral facing surface during rotation in the locking direction to bring the locking elements into aligned locking engagement.

In the above-identified copending patent application, a relief is provided by a first peripheral surface which is in the form of a first arcuate slot or notch having a particular length and width. A first protrusion is provided by a second confronting peripheral surface in the form of a first locking tab which is sized and configured to be received within the first arcuate slot. Advantageously, a second arcuate slot or notch can be provided on the first peripheral surface peripherally spaced from the first arcuate slot and having a different length and width than the first arcuate slot. A second protrusion is provided on the second confronting peripheral surface in the form of a second locking tab which is sized and configured to be received within the second arcuate slot. Because of the differences in sizes of the respective slots and locking tabs, the first locking tab cannot enter the second slot and the second locking tab cannot enter the first slot. Thus, the coupling members must be rotated in the locking direction sufficiently for the locking tabs to be aligned with their corresponding slots before locking engagement can occur. In this way, it is possible to provide a secure, but releasable, lock on a fluid coupling.

A lock ring is mounted around and secured to one of the coupling embers and has one of the confronting faces positioned thereon. A resilient member in the form of an annular ring urges the lock ring toward the confronting face of the other coupling member. Thus, proper alignment between the locking tabs on corresponding confronting faces results in engagement between the respective locking tabs and slots when they are aligned.

In first embodiment of the present invention, the lock ring has an annular wall forming one of the confronting faces and an internal peripheral retaining groove in which the annular resilient member, in the form of an annular spring with peripherally spaced spring fingers, is positioned. This assembly, of the lock ring with annular spring therein, is threadably mounted on a first coupling member having external threads on one end and a flange on the other end spaced from the threads to provide a retaining groove for the annular spring. The external threads have alternating ridges and valleys wherein the ridges have a first larger diameter and the valleys have a second smaller diameter. The annular spring has an internal peripheral edge having a diameter which is smaller than the larger diameter of the ridges and larger than the smaller diameter of the valleys. The annular spring is threadably received on the external threads and captured in the retaining groove. The spring fingers urge the complimentary locking elements toward each other so that they make contact with each other and subsequently interlock in a fixed rotational and locked position. By threading the spring on the coupling member, the diameter of the spring and lock ring assembly can be minimized to reduce the overall size and weight of the coupling, which is an important consideration in aircraft applications.

Conveniently, indicia in the form of an indicator stripe may be provided around the outer peripheral surface of coupling member whose face is engaged against the face of the lock ring. This indicator stripe has a maximum width equal to the height of the locking tabs and corresponds to the pitch of the threads. Thus, during rotation of the coupling members in the locking direction, the indicator stripe will be exposed thus indicating that a positive locking engagement between the coupling members has not yet been achieved. However, when the locking tabs become aligned with the corresponding arcuate slots of complementary size and shape, the lock ring will suddenly move longitudinally a distance equal to the height of the locking tabs and cover the indicator stripe. When the indicator stripe can no longer be seen, a mechanic knows that positive locking engagement of the coupling has occurred.

In a second embodiment of the present invention, an annular resilient member, in the form of a split wavy spring, has an internal peripheral edge whose diameter is smaller than the outer diameter of the threads. It is radially expanded, slid over the threads and radially contracted so that it is in a retaining groove of a coupling member. The lock ring has peripherally spaced longitudinal fingers extending from the confronting face which form a cage surrounding the wavy spring. The ends of the fingers have inwardly extending lips that extend radially inward so that they are engageable with the coupling member flange to limit movement of the lock ring for the external threads. The ends of these fingers also have radially outwardly extending lips. The confronting face of the lock ring has a peripheral shoulder. A knurled band extends around the fingers to enclose the wavy spring and has opposite side edges which are captured by the peripheral shoulder of the coupling member and the radially outwardly extending lips of the respective fingers. Since the split wavy spring has an inner diameter which is less than that of the outer diameter of the external threads of the coupling member, its size is minimized for the same reasons as discussed with respect to the previous embodiment and provides the same advantages.

Additional advantages of this invention will become apparent from the detailed description which follows, taken in conjunction with the accompanying drawings.

BEST MODE FOR CARRYING OUT THE INVENTION

In accordance with this invention, a coupling assembly 10 is provided for interconnecting fluid carrying tubes or conduits 11 and 12 in fluid communicating relationship. Conduit 11 has a peripheral sealing flange 14 securely attached thereto which includes an O-ring 16 within peripheral groove 18. Similarly, conduit 12 has a peripheral sealing flange 20 securely attached thereto which includes an O-ring 22 within peripheral groove 24.

Conveniently, coupling assembly 10 includes a first coupling member, such as coupler 25, having a generally cylindrical body 26 whose inner surface 27 is in fluid-tight relationship with O-rings 16 and 22, respectively. Body 26 has a shoulder 28 with an internal peripheral groove 30 to hold split ring 31. Split ring 31 is engageable with a stop, in the form of peripheral rib 32 on sealing flange 20, to prevent longitudinal separation of coupling assembly 10. A peripheral, resilient, electrically conductive bonding wire 33 is mounted in split ring 31, as shown, and contacts the outer surface of sealing flange 20 to provide electrical continuity from flange 20, through the coupling 10, to flange 14. The opposite end of coupler 25 is provided with external threads 34 which are spaced from shoulder 28 to form a peripheral recess or groove 35 therebetween.

A second coupling member, in the form of nut 36, is mounted on flange 14 and has a generally cylindrical body 37 with an internal peripheral groove 38 holding split ring 39. A bonding wire 40, similar to bonding wire 33, is provided and split ring 39 to contact the outer surface of sealing flange 14 to provide electrical continuity. Flange 14 has a stop, in the form of peripheral rib 41, which is engageable with split ring 39 to prevent separation of coupling assembly 10. Nut 36 has internal threads 42 which engage threads 34 of coupler 25 so that the coupler 25 and nut 36 can be drawn together longitudinally into a locked position, as will be more fully explained below.

A locking element in the form of a lock ring 43 is mounted about the outer periphery of coupler 25 by means of annular spring 44 for longitudinal movement with respect to coupler 25 and nut 34, as more fully described below. The structure of coupler 25, nut 36, lock ring 43, and annular spring 44 can best be understood by looking at FIGS. 2–7.

Figure 3:
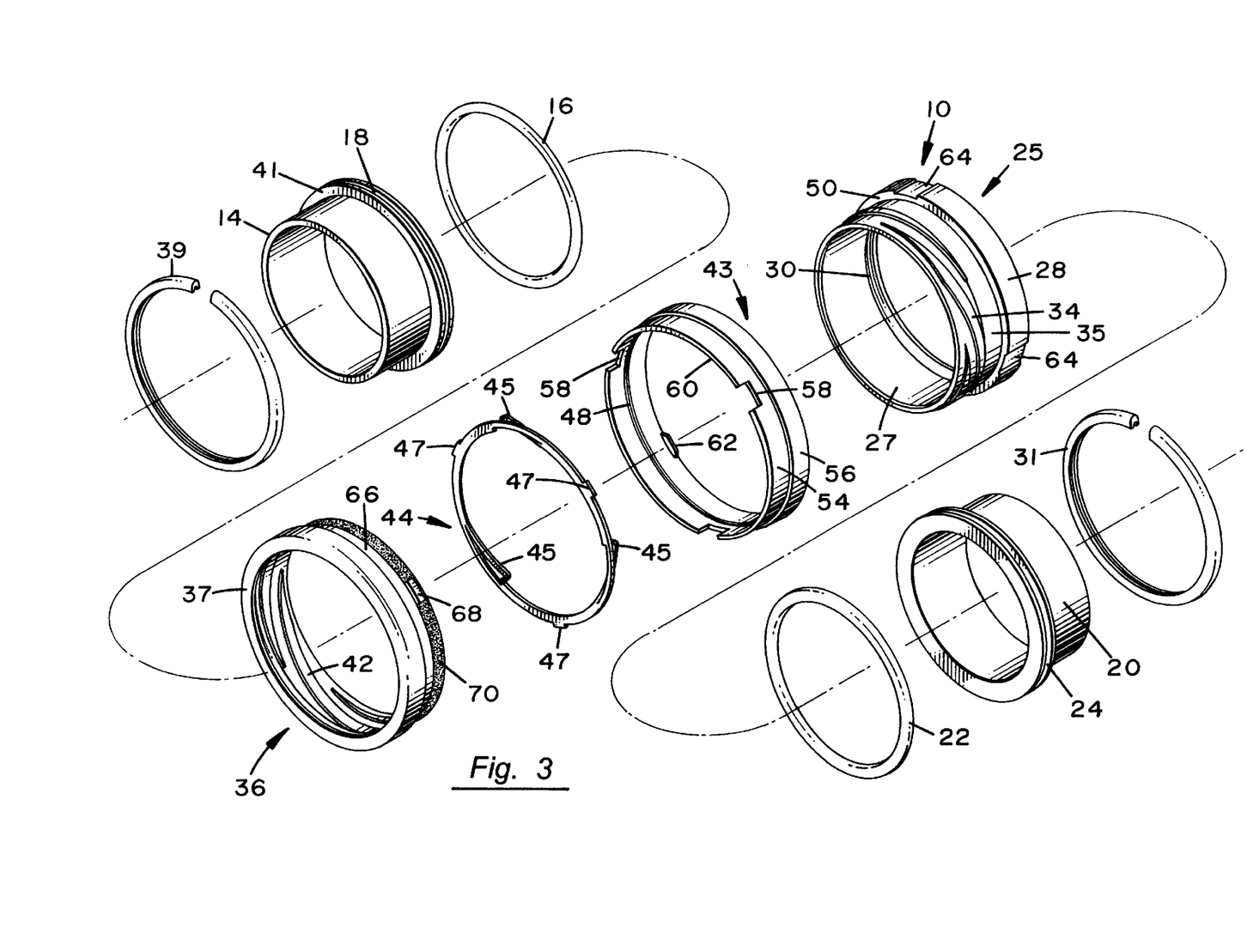
FIG. 3 is an exploded perspective view of the coupling of FIG. 1.
Figure 4:
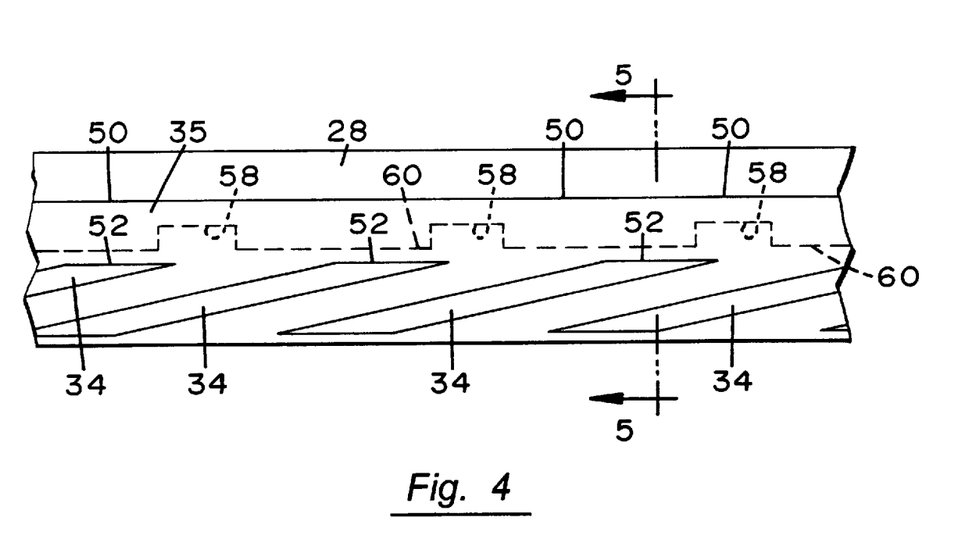
FIG. 4 is a plan view of the external threads of the coupler with a portion of the lock ring shown in phantom.
Figure 5:
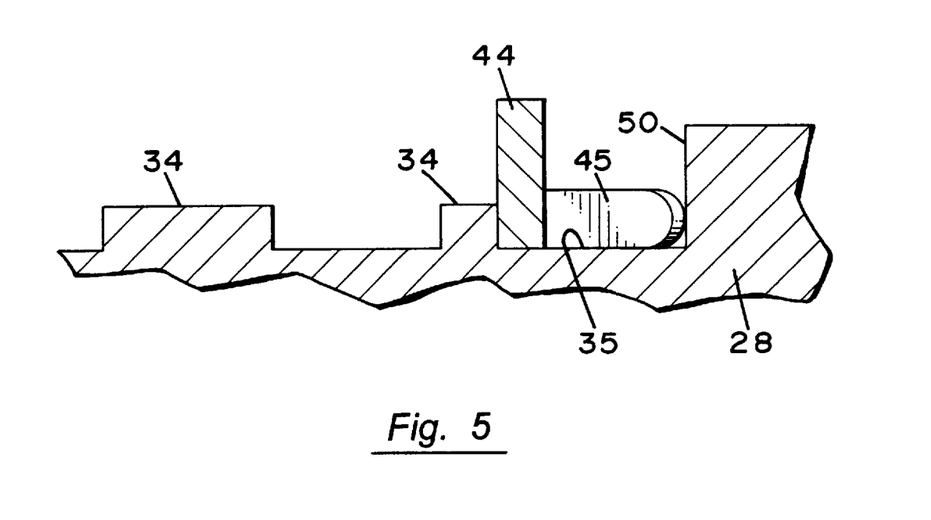
FIG. 5 is a greatly enlarged fragmentary horizontal section, taken along line 5—5 of FIG. 4, showing the position of the annular spring on the lock ring.
Figure 6:
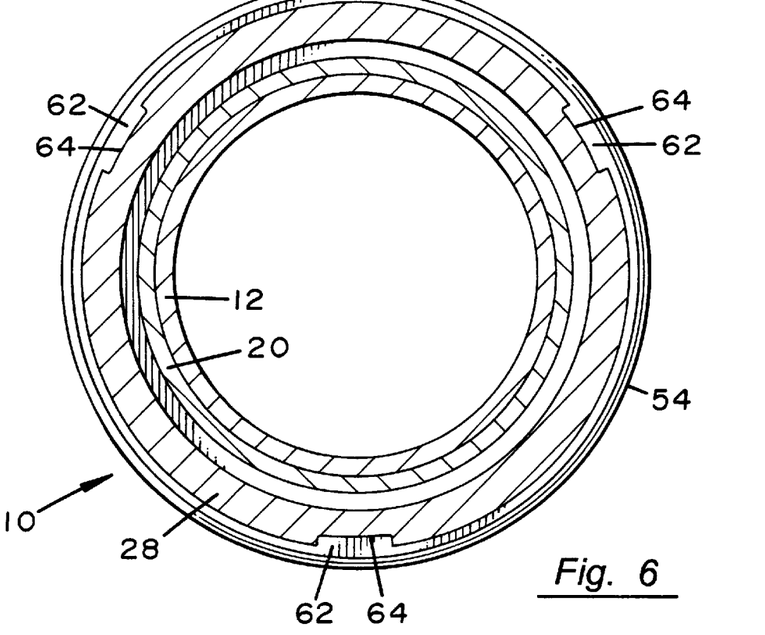
FIG. 6 is a vertical section, on a reduced scale, taken along line 6—6 of FIG. 2, showing how the lock ring is mounted on the first coupling member.
Figure 7:
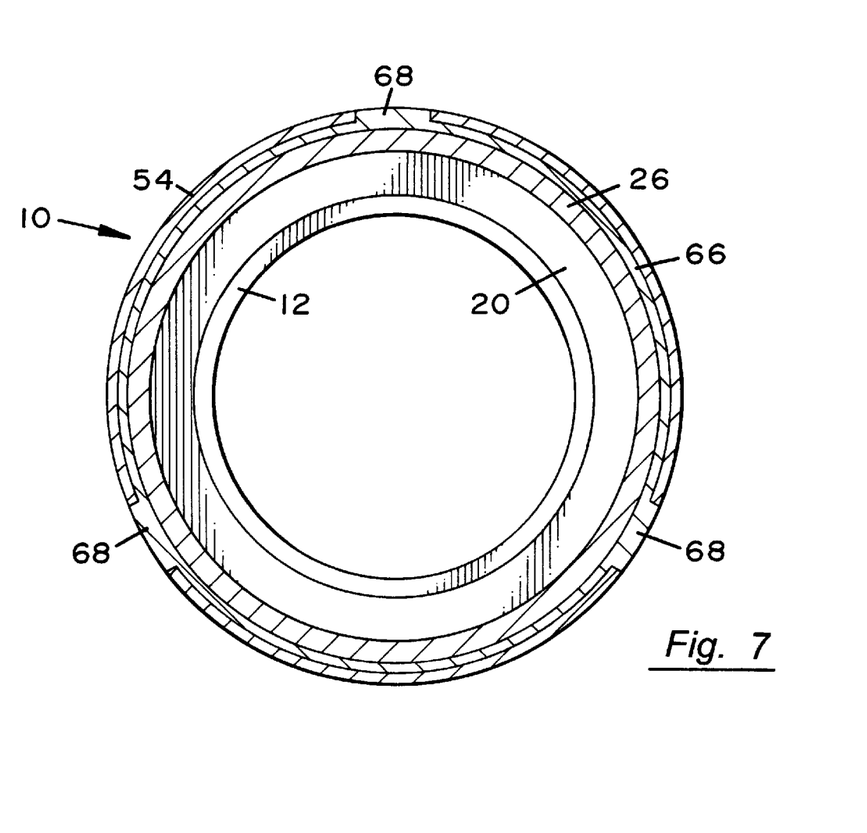
FIG. 7 is a vertical section, on a reduce scale, taken along line 7—7 of FIG. 2, showing the nut and lock ring in the locked position.

Annular spring 44 includes a plurality of spring fingers 45 about its outer periphery, each of which extends at an angle to the plane of annular spring 44, as best seen and FIG. 3. Although three fingers have been shown, it will be apparent to one of ordinary skill in the art that a lesser or greater number could be provided. Also, the fingers could extend from the opposite side of the annular spring. Annular spring 44 has a plurality of angularly spaced, outwardly projecting tabs 47 for mounting annular spring 44 within an internal peripheral groove 48 in lock ring 43. A greater or lesser number of tabs could be provided. Advantageously, the diameter of the inner peripheral edge of annular spring 44 is less than the diameter of the peaks of threads 34 but greater than the diameter of the valleys of the threads. Thus, annular spring 44 is rotatably threaded onto threads 34 of coupler 25 until annular spring 44 is captured between edge 50 of shoulder 28 and the end surfaces 52 of the respective threads 34, as best seen in FIGS. 4 and 5. Surfaces 52 are generally parallel to edge 50 to form peripheral groove or recess 35 which contains annular spring 44.

Conveniently, lock ring 43 has a peripheral flange 54 with a knurled outer surface 56 for grasping it. Flange 54 also includes peripherally spaced reliefs or locking elements, such as notches or recesses 58 formed along the inner peripheral edge thereof. Three notches have been shown but it should be understood that a greater or lesser number could be used in certain applications. Along the opposite edge of lock ring 43 are radially inwardly extending alignment tabs 62 which are also three in number and are spaced angularly between the notches 58.

After annular spring 44 is positioned in peripheral groove 35, lock ring 43 is oriented so that alignment tabs 62 are aligned with alignment slots 64. Then the lock ring is slid axially onto coupler 25 from the right, as viewed in FIG. 2, deforming annular spring 44 until tabs 47 thereon snap into peripheral groove 48 to position and hold lock ring 43 on coupler 27. When in this assembled position, spring fingers 45 bear against edge 50 and urge lock ring 43 to the left, as viewed in FIG. 2.

A peripheral flange 66 extends axially from body 37 which has angularly spaced, outwardly projecting protrusions or locking tabs 68. When nut 36 is threaded onto coupler 25, causing nut 36 to move longitudinally toward coupler 25, the outer peripheral edges of locking tabs 68 engage and then slide angularly along inner edge 60 of lock ring 43. In response to the engagement of edge 60 by locking tabs 68, lock ring 43 is moved to the right, as viewed in FIG. 2, against the force of annular spring 44. When locking tabs 68 become aligned with locking notches 58, lock ring 43 snaps back to the left, as viewed in FIG. 2, so that the locking notches 58 interlock with locking notches 58 to secure coupling assembly 10 in locked position. Flange 66 is provided with colored indicator stripe 70 which has a width that is no greater than the height of locking tabs 68 so that it is covered by flange 54 on lock ring 43 when the coupling assembly 10 is in locked position. In this manner, one can tell by visual observation whether or not coupling assembly 10 is in fully locked position.

As seen in FIG. 4, flights of threads 34 are equal in number to locking notches 58 and each flight has an angular length equal to the spacing between locking notches 58 and a thread pitch which moves the coupling members longitudinally between the unlocked position and the lock position through an angular rotation equal to the annular spacing of locking notches 58. This makes it easy to quickly connect or disconnect coupling assembly 10.

Figure 1:
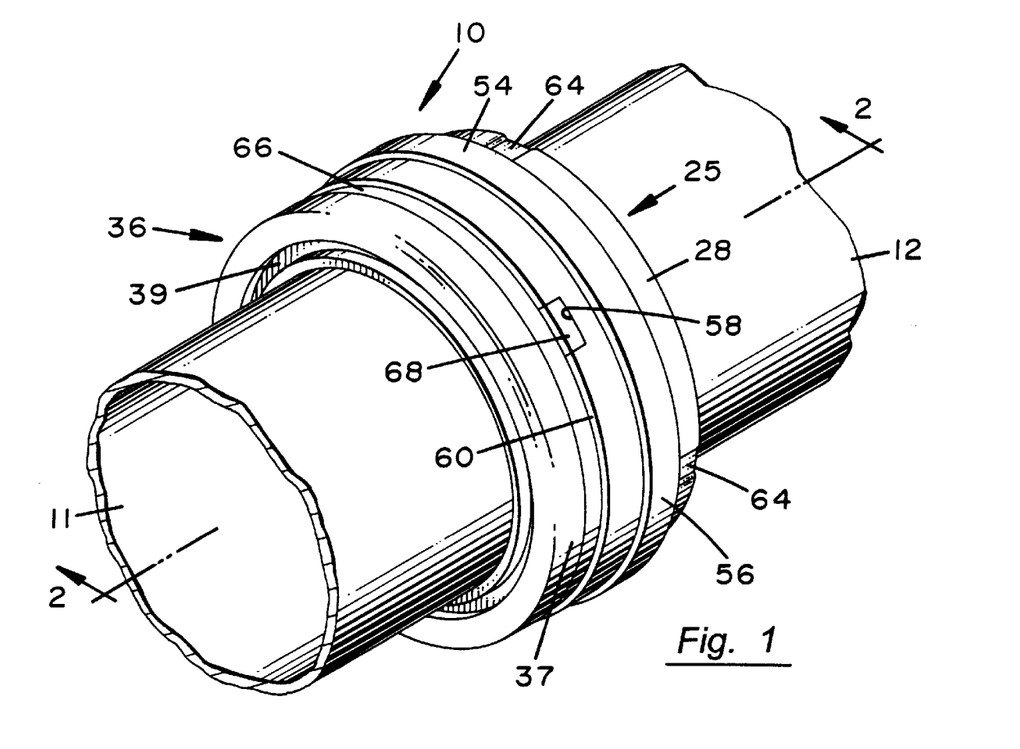
FIG. 1 is a perspective view of the first embodiment of the coupling of the present invention.
Figure 2:
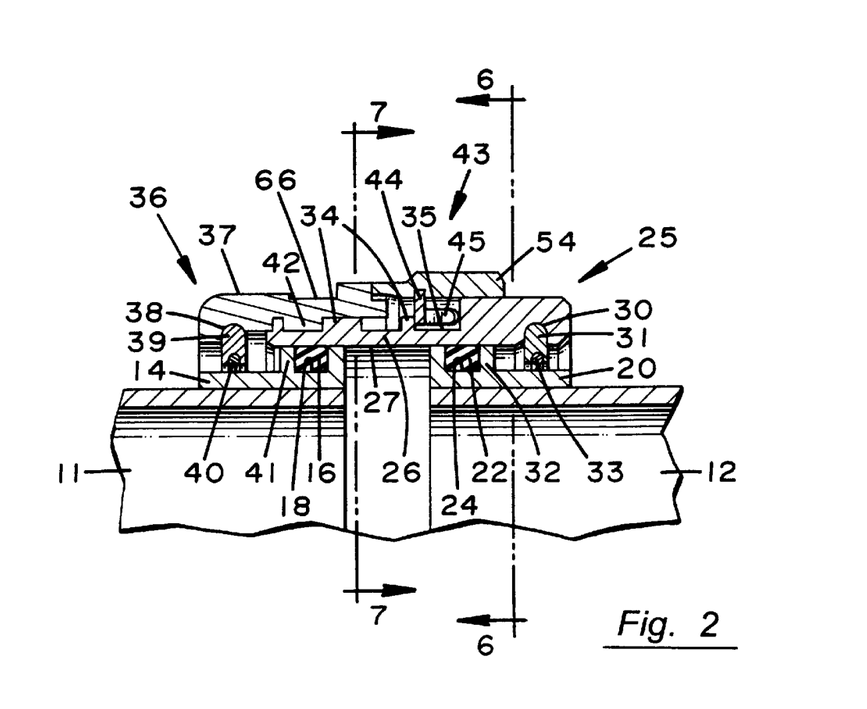
FIG. 2 is an enlarged fragmentary longitudinal section, taken along line 2—2 of FIG. 1, showing details of the coupling.

To unlock coupling assembly 10, lock ring 43 is pushed to the right, as viewed in FIG. 2, against the force of annular spring 44 so that locking notches 58 are retracted from locking tabs 68 whereupon nut 36 is rotated in the counter-clockwise or unlocking direction to unlock the coupling assembly.

Figure 8:
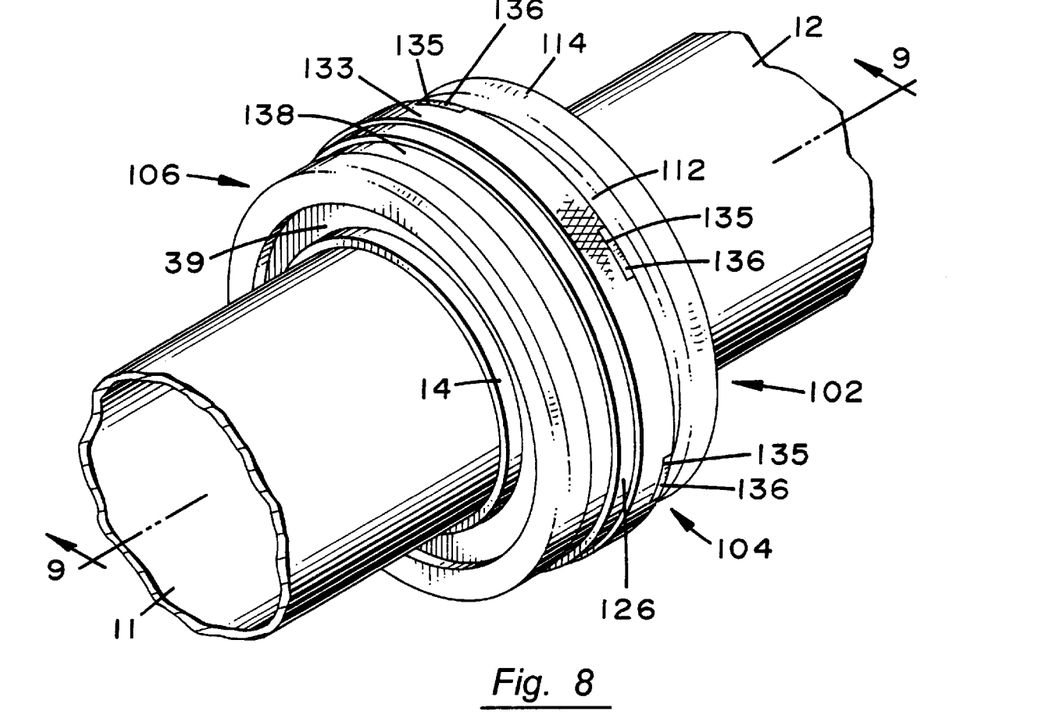
FIG. 8 is a perspective view of a second embodiment of the coupling assembly of this invention.
Figure 9:
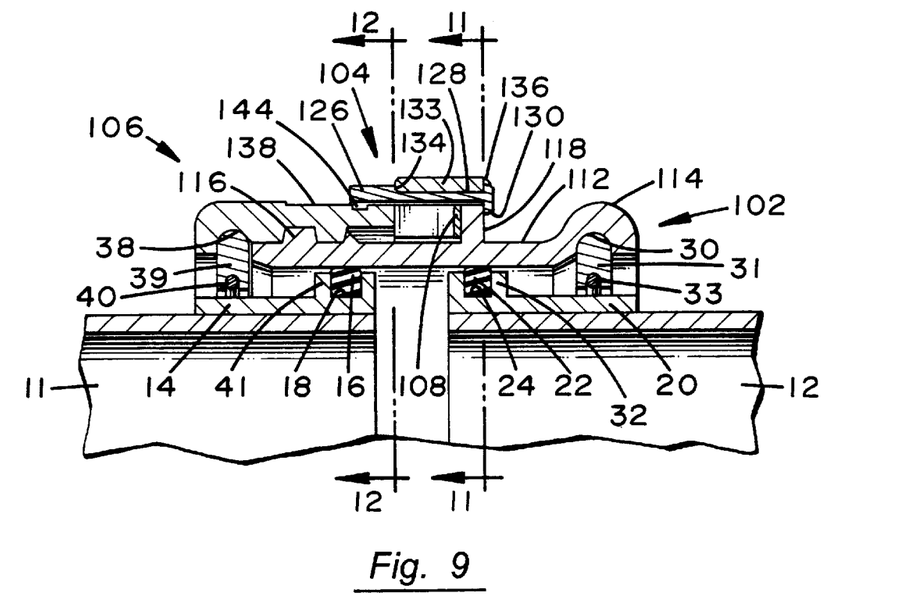
FIG. 9 is a fragmentary longitudinal section, taken along line 9—9 of FIG. 8.
Figure 10:
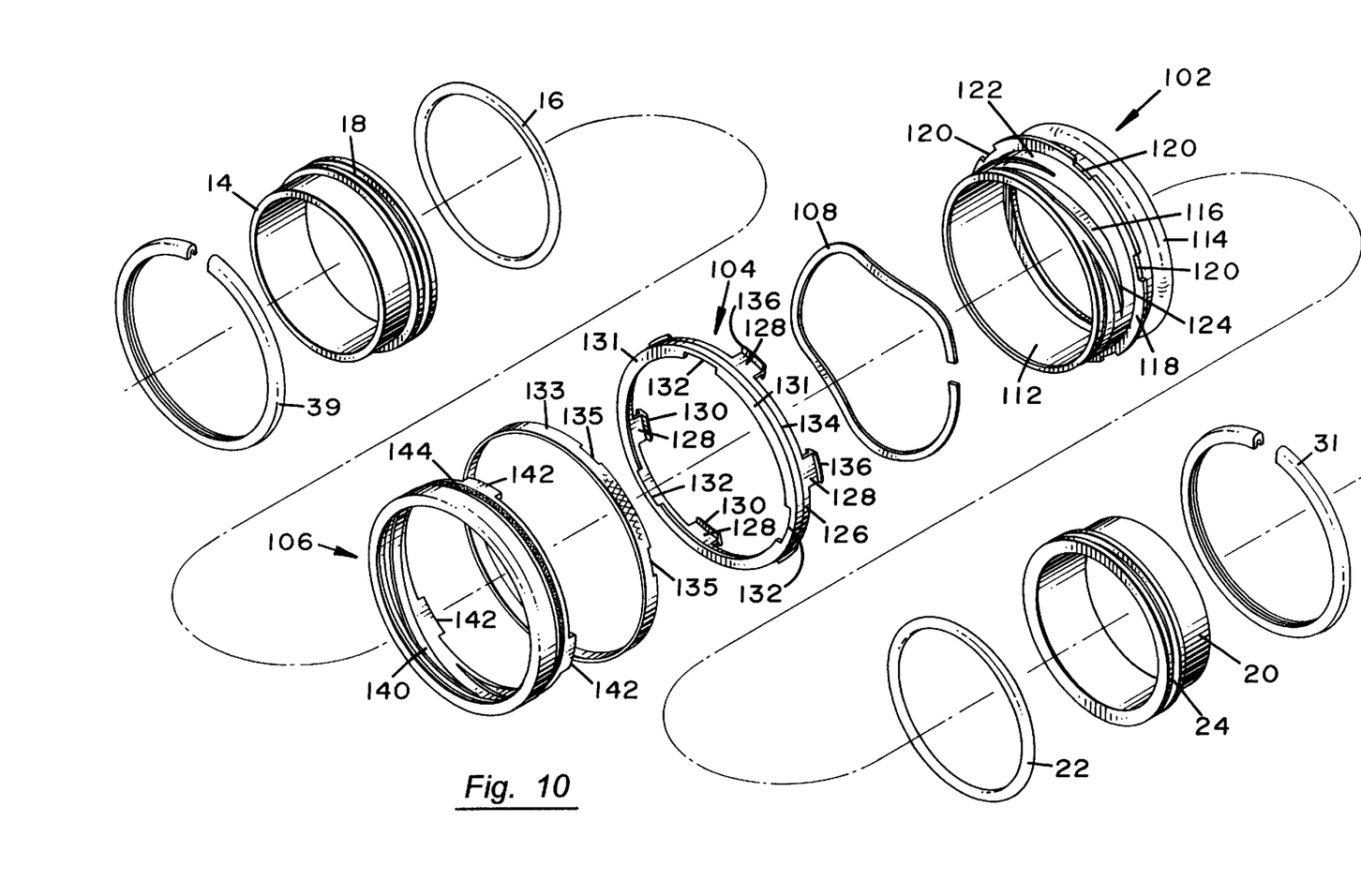
FIG. 10 is an exploded perspective view of the coupling of FIG. 8.
Figure 11:
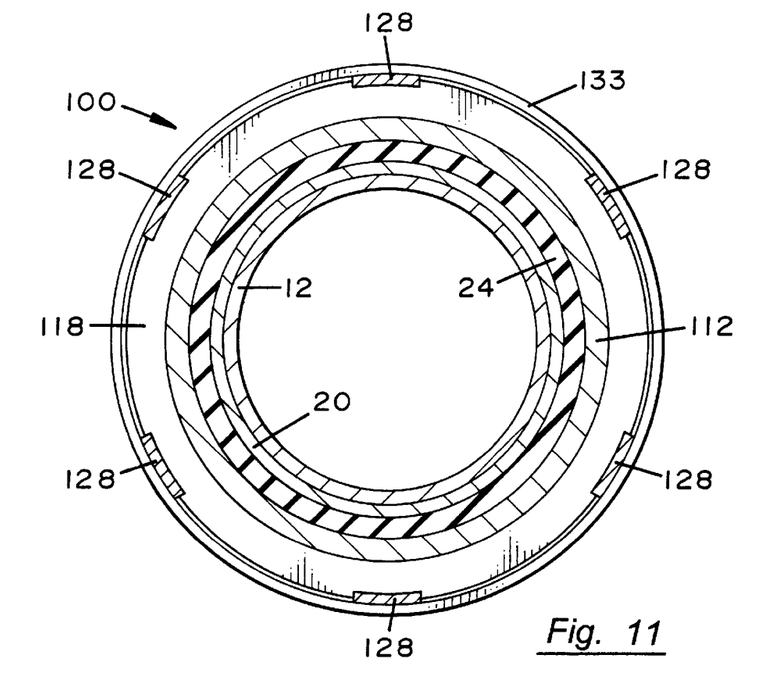
FIG. 11 is a vertical section, on a reduced scale, taken along line 11—11 of FIG. 9 showing how the lock ring attaches to the first coupling member.
Figure 12:
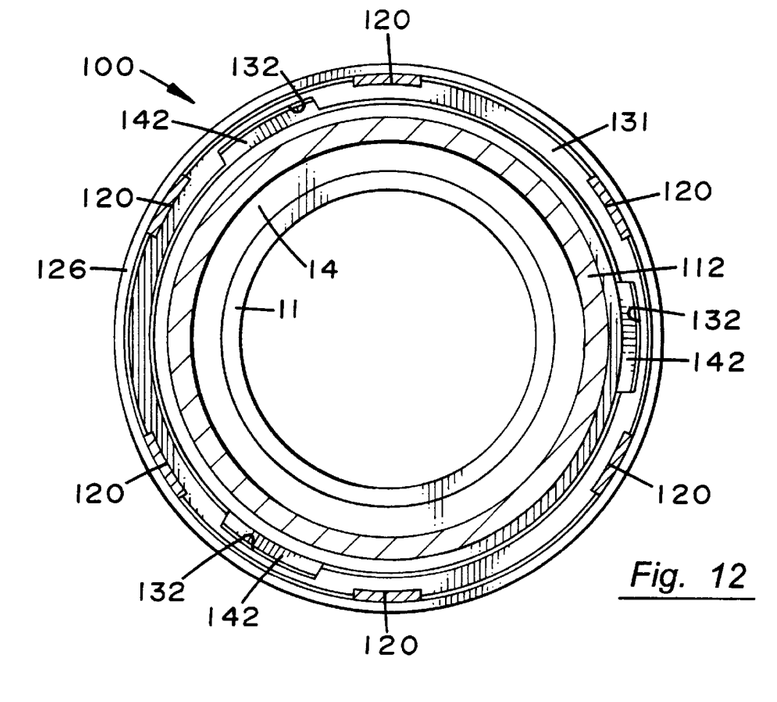
FIG. 12 is a vertical section, on a reduced scale, taken along line 12—12, showing the nut and lock ring in locked position.

A second embodiment is shown in FIGS. 8–12 wherein a different form of lock ring and spring assembly is provided. As best seen in FIGS. 8–10, sealing flanges 14 and 20 of conduits 11 and 12, respectively, are joined together in fluid communication by coupling assembly 100. Similar reference numerals are used to represent similar parts which are common to both embodiments. Coupling assembly 100 comprises a first coupling member in the form of coupler 102, a lock ring 104 and a second coupling member in the form of nut 106, together with split annular wave or undulating spring 108.

Coupler 102 has a generally cylindrical body 112 with an outer peripheral rim 114 at one end and external peripheral threads 116 adjacent the opposite end. Between rim 114 and threads 116 is a peripheral flange 118 with angularly spaced notches 120 therein. Although six notches are shown, it will be understood that a greater or lesser number of notches can be provided. A peripheral groove or recess 122 is formed between the side of flange 118 and the inner ends 124 of threads 116 for holding wavy spring 108 in the same way that annular spring 44 is contained in recess 35 of the previous embodiment. The internal peripheral edge of wavy spring 108 has a diameter which is greater than the valley of threads 116 but less than the peaks of threads 116. Since wavy spring 108 is split, as shown in FIG. 10, it can be radially opened to a larger diameter and assembled over threads 116 and released into peripheral groove 122. Due to its resilience, wavy spring 108, when released, returns to its original smaller diameter so as to be captured in peripheral groove 122. This minimizes the diameter of wavy spring 108, as well as lock ring 104, to minimize the size and weight of coupling assembly 100, which is desirable in aircraft applications.

After wavy spring 108 is positioned in groove 122, lock ring 104 is placed over it. Lock ring 104 has an annular body 126 with angularly spaced resilient fingers 128 that extend over wavy spring 108. The ends of fingers 128 each have an inwardly extending lip 130 each of which engage a notch 120 to interconnect lock ring 104 with coupler 102 and capture wavy spring 108 therebetween. In addition, body 126 has a peripheral face 131 with angularly spaced, peripheral locking notches or recesses 132. Although three notches are shown, a greater or lesser number could be used.

A knurled band 133 is press fitted over body 126 of lock ring 104 so that it covers wavy spring 108 and fingers 128. One side edge of band 133 is engaged by shoulder 134 on body 126 and the other side edge of band 133 is engaged by outwardly turned lips 136 on the respective fingers 128, as best seen in FIG. 9. Conveniently, band 133 has angularly spaced notches 135 which interlock with outwardly turned lips 136 to assists in securing band 133 to lock ring 104.

Nut 106 has an annular body 138 with internal threads 140. Peripherally spaced locking tabs 142 extend from the inner edge of body 138 for interconnecting nut 106 and coupler 102. The number, pitch and relationship of threads 116 to locking notches 132 is identical to that shown in FIG. 4 of the previous embodiment. Thus, coupling assembly 100 is quickly connected and disconnected in the same manner as described previously.

In this regard, when threads 140 are threaded onto threads 116, locking tabs 142 engage and then slide angularly along face 131 of lock ring 104. This causes the lock ring to move to the right, as viewed in FIG. 9, against the force of wavy spring 108 until locking tabs 142 are aligned with locking notches 132 whereupon the lock ring snaps to the left so that locking tabs 142 become interlocked with locking notches 132.

Body 138 has an indicator stripe in the form of peripheral groove 144 adjacent locking tabs 142. This stripe is a contrasting color to the coupling to indicate whether or not the coupling is locked. When in the locked position, stripe 144 is covered by body 126 of lock ring 104, as shown in FIG. 9.

To disengage coupling assembly 100, lock ring 104 is pushed to the right by grasping knurled band 133, as shown in FIG. 9, resulting in locking tabs 142 being separated from locking notches 132 whereupon nut 106 can be rotated in the unlocking or counterclockwise direction to separate coupling assembly 100.

From the foregoing, the advantages of this invention are readily apparent. In the first embodiment, the inner peripheral diameter of annular spring 44 is sized to be threadably received over the threads of the coupler 25 and is held in recess 35 formed by the ends 52 of threads 34 and edge 50 of shoulder 28. This structure minimizes the diameter of annular spring 44 and lock ring 43 to minimize both the size and weight of coupling assembly 10. Additionally, it provides a quick connect, quick disconnect coupling and has a peripheral stripe to provide a visual indication of its connected or disconnected status. In the second embodiment, the split in wavy spring 108 allows it to be radially enlarged to pass over the threads of coupler 102 and then spring back to its original smaller diameter and be held in a recess 122 formed by the ends 124 of threads 116 and flange 118. This structure also minimizes the diameter of annular spring 44 and lock ring 104 to minimize both the size and weight of coupling assembly 100. This structure also provides a quick connect, quick disconnect coupling and has an indicator stripe to identify whether or not the coupler is in locked position.

This invention has been described in detail with reference to particular embodiments thereof, but it will be understood that various other modifications can be effected without departing from the spirit and scope of this invention.

What is claimed is:

1. A threaded coupling apparatus for interconnected ends of first and second fluid-carrying conduit members in a fixed releasable locking relationship, said apparatus comprising:

first and second coupling members, each having a peripheral surface, circumferentially engageable with the ends of the conduit members to hold them in fluid communication, said coupling members being rotatable with respect to each other in a locking direction to a locked position and in an opposite unlocking direction to an unlocked position to unfasten said coupling apparatus;

a first complementary locking element located on said first coupling member;

a second complimentary locking element located on said second coupling member;

external threads on said first coupling member, said external threads forming alternating ridges and valleys, said ridges having a first larger diameter and said valleys having a second smaller diameter;

internal threads on said second coupling member for cooperative engagement with said external threads, said threads being angularly oriented with said complementary locking elements so that said complimentary locking elements become aligned only when said coupling members are rotated with respect to each other to said locked position; and an annular resilient member having an internal peripheral edge having a diameter which is lesser than said first larger diameter and positioned on said first coupling member for urging said complimentary locking elements toward each other so that they make contact with each other and subsequently interlock during rotation in the locking direction when said complimentary locking elements become aligned to hold said first and second coupling members in a fixed rotational and locked position.

2. Apparatus, as claimed in claim 1, further comprising:
a lock ring which includes one of said first and second locking elements, said resilient member being mounted within and supporting said lock ring and being attached to one of said first and second coupling members to urge said one of said first and second locking elements toward said other of said first and second locking elements.

3. Apparatus, as claimed in claim 2, wherein:
said diameter of said internal peripheral edge of said annular resilient member is smaller than said first larger diameter of said ridges.

4. Apparatus, as claimed in claim 3, wherein:
said internal peripheral edge of said annular resilient member is threadably received on said external threads.

5. Apparatus, as claimed in claim 2, wherein:
said resilient member is an annular wave spring.

6. Apparatus, as claimed in claim 5, wherein:
said annular wavy spring is split so that it can be radially opened to a diameter larger than said first larger diameter of said ridges and assembled over said external threads and then returned to a diameter which is less than said first larger diameter.

7. Apparatus, as claimed in claim 2, said resilient member further comprising:
an annular ring; and
a plurality of peripherally spaced fingers formed on said annular ring and engageable with said lock ring for urging said one of said first and second locking elements toward said other of said first and second locking elements.

8. An apparatus, as claimed in claim 2, wherein:
said first complimentary locking element has at least one relief; and
said second complimentary locking element has at least one protrusion configured to interlock with said at least one relief.

9. Apparatus, as claimed in claim 8, wherein:
said first complimentary locking element includes a plurality of reliefs equally and angularly spaced about said peripheral surface of said first coupling member; and
said second locking element includes a plurality of protrusions angularly spaced about said second coupling member a distance equal to the spacing of said plurality of reliefs so that when said protrusions are aligned with said reliefs said lock ring is movable axially to snap said protrusions into said reliefs to positively lock said first and second coupling members in the fixed rotational position.

10. Apparatus as claimed and claim 9, wherein said protrusions have a predetermined height, and said second coupling member further includes:
an indicator stripe extending around said peripheral surface thereof and having a width no greater than the predetermined height of said protrusions so that when said protrusions engage said reliefs, said lock ring moves longitudinally to cover said indicator stripe.

11. Apparatus, as claim in claim 8, wherein said external threads comprise:
a plurality of thread flights equal in number to said plurality of reliefs, each said flight having an angular length equal to the spacing between reliefs and having a thread pitch which enables said coupling members to move longitudinally between said unlocked position and said locked position through an angular rotation equal to said angular spacing of said reliefs.

12. Apparatus, as claimed in claim 8, wherein:

said first coupling member has a peripheral flange spaced from said external threads;

said lock ring includes a peripheral facing surface having said plurality of reliefs therein; and a plurality of peripherally spaced fingers extending longitudinally from said facing surface toward said peripheral flange of said first coupling member, each said finger having an inturned lip extending radially inward and engageable with said peripheral flange to limit movement of said lock ring toward said external threads by said wavy spring.

13. Apparatus, as claimed in claim 12, wherein:

said annular resilient member is a wavy spring.

14. Apparatus, as claimed in claim 13, wherein:

said annular wavy spring is split so that it can be radially opened to a diameter larger than said first larger diameter of said ridges and assembled over said external threads and then returned to a diameter which is less than said first larger diameter.

15. Apparatus, as claimed in claim 14, wherein:

said external threads each have ends which cooperate with said peripheral flange of said first coupling member to form a peripheral groove therein which captures said annular wavy spring therein after its internal peripheral edge is returned to said diameter which is less than said first larger diameter of said ridges.

16. Apparatus, as claimed in claim 12, wherein:

said first complimentary locking element includes a plurality of reliefs equally and angularly spaced about said peripheral surface of said first coupling member; and said second locking element includes a plurality of protrusions angularly spaced about said second coupling member a distance equal to the spacing of said plurality of reliefs so that when said protrusions are aligned with said reliefs said lock ring is movable axially to snap said protrusions into said reliefs to positively lock said first and second coupling members in the fixed rotational position.

17. Apparatus, as claim in claim 16, wherein said external threads comprise:

a plurality of thread flights equal in member to said plurality of reliefs, each said flight having an angular length equal to the spacing between reliefs and having a thread pitch which enables said coupling members to move longitudinally between said unlocked position and said lock position through an angular rotation equal to said angular spacing of said reliefs.

18. Apparatus, as claim in claim 17, wherein said peripheral flange includes:

a plurality of notches spaced around the periphery thereof a distance equal to the spacing of said fingers, said fingers extending through said respective notches.

19. Apparatus, as claimed in claim 18, wherein:

a band, having opposite side edges and inner and outer peripheral surfaces, extending around said fingers so that its inner peripheral surface is supported by said fingers.

20. Apparatus, as claimed in claim 19, wherein:

said end of each of said fingers has a radially outwardly extending lip so that said opposite side edges of said band are captured between said peripheral flange and said radially outwardly extending lips, respectively.

21. A threaded coupling apparatus for interconnected ends of first and second fluid-carrying conduit members in a fixed releasable locking relationship, said apparatus comprising:

first and second coupling members, each having a peripheral surface, circumferentially engageable with the ends of the conduit members to hold them in fluid communication, said coupling members being rotatable with respect to each other in a locking direction to a locked position and in an opposite unlocking direction to an unlocked position to unfasten said coupling apparatus;

a first complementary locking element located on said first coupling member;

a second complimentary locking element located on said second coupling member having a plurality of protrusions angularly spaced about said second coupling member a distance equal to the spacing of said plurality of reliefs so that when said protrusions are aligned with said reliefs said lock ring is movable axially to snap said protrusions into said reliefs to positively lock said first and second coupling members in the fixed rotational position;

external threads on said first coupling member forming alternating ridges and valleys, said ridges having a first larger diameter and said valleys having a second smaller diameter, said first coupling member having a peripheral flange spaced from said external threads;

internal threads on said second coupling member for cooperative engagement with said external threads, said threads being angularly oriented with said complementary locking elements so that said complimentary locking elements become aligned only when said coupling members are rotated with respect to each other to said locked position;

an annular resilient member positioned on said first coupling member for urging said complimentary locking elements toward each other so that they make contact with each other and subsequently interlock during rotation in the locking direction when said complimentary locking elements become aligned to hold said first and second coupling members in a fixed rotational and locked position;

a lock ring including a first locking element, said resilient member being mounted within and supporting said lock ring and being attached to said first coupling member to urge said first locking element toward said second locking element, said lock ring further including a peripheral facing surface having a plurality of angularly spaced reliefs thereon; and a plurality of peripherally spaced fingers extending longitudinally from said facing surface toward said peripheral flange of said first coupling member, each said finger having an inturned lip extending radially inward and engageable with said peripheral flange to limit movement of said lock ring toward said external threads by said wavy spring.

22. Apparatus, as claimed in claim 21, wherein:

said annular wavy spring is split so that it can be radially opened to a diameter larger than said first larger diameter of said ridges and assembled over said external threads and then returned to a diameter which is less than said first larger diameter.

23. Apparatus as claimed and claim 22, wherein said protrusions have a predetermined height, and said second coupling member further includes:

an indicator stripe extending around said peripheral surface thereof and having a width no greater than the predetermined height of said protrusions so that when said protrusions engage said reliefs, said lock ring moves longitudinally to cover said indicator stripe.

24. Apparatus, as claim in claim 22, wherein said external threads comprise:

a plurality of thread flights equal in number to said plurality of reliefs, each said flight having an angular length equal to the spacing between reliefs and having a thread pitch which enables said coupling members to move longitudinally between said unlocked position and said locked position through an angular rotation equal to said angular spacing of said reliefs.

25. Apparatus, as claimed in claim 24, wherein:

said external threads each have ends which cooperate with said peripheral flange of said first coupling member to form a peripheral groove therein which captures said annular wavy spring therein after its internal peripheral edge is returned to said diameter which is less than said first larger diameter of said ridges.

26. Apparatus, as claim in claim 22, wherein said peripheral flange includes:

a plurality of notches spaced around the periphery of said peripheral flange of said first coupling member a distance equal to the spacing of said fingers, said fingers extending through said respective notches.

27. Apparatus, as claimed in claim 26, wherein:

a band, having opposite side edges and inner and outer peripheral surfaces, extending around said fingers so that its inner peripheral surface is supported by said fingers.

28. Apparatus, as claimed in claim 27, wherein:

said end of each of said fingers has a radially outwardly extending lip so that said opposite side edges of said band are captured between said peripheral flange and said radially outwardly extending lips, respectively.

* * * * *